United States Patent [19]

Smith et al.

[11] Patent Number: 5,011,737
[45] Date of Patent: Apr. 30, 1991

[54] GLOSSY FINISH FIBER REINFORCED MOLDED PRODUCT AND PROCESSES OF CONSTRUCTION

[75] Inventors: Rayna W. Smith, Harrisburg, Pa.; Gerald W. Miller, Cincinnati, Ohio

[73] Assignee: C. H. Masland & Sons, Carlisle, Pa.

[21] Appl. No.: 531,693

[22] Filed: Jun. 1, 1990

Related U.S. Application Data

[60] Division of Ser. No. 314,896, Feb. 24, 1989, Pat. No. 4,948,661, which is a continuation-in-part of Ser. No. 71,969, Jul. 10, 1987, Pat. No. 4,950,439.

[51] Int. Cl.$^5$ .................. B29C 51/02; B29C 51/14; B32B 31/20; B32B 33/00
[52] U.S. Cl. .................. 428/409; 156/308.2; 264/112; 264/119; 264/122; 264/294
[58] Field of Search .................. 428/409; 264/112, 119, 264/122, 257, 258, 294, 320, 331.17, 331.19, 331.21; 156/308.2

[56] References Cited

U.S. PATENT DOCUMENTS

| | | |
|---|---|---|
| 2,483,405 | 10/1949 | Francis . |
| 2,543,101 | 2/1951 | Francis, Jr. . |
| 4,044,188 | 8/1977 | Segal .................. 428/409 |
| 4,098,943 | 7/1978 | Degginger .................. 428/409 |
| 4,258,093 | 3/1981 | Benedyk .................. 428/298 |
| 4,258,094 | 3/1981 | Benedyk . |
| 4,263,364 | 4/1981 | Seymour .................. 428/430 |
| 4,269,884 | 5/1981 | Dell Vecchia .................. 428/247 |
| 4,379,801 | 4/1983 | Weaver et al. .................. 428/341 |
| 4,379,802 | 4/1983 | Weaver et al. .................. 428/341 |
| 4,407,885 | 10/1983 | Murphy et al. . |
| 4,424,250 | 1/1984 | Adams et al. . |
| 4,474,846 | 10/1984 | Doerer et al. .................. 428/284 |
| 4,568,581 | 2/1986 | Peoples .................. 428/296 |
| 4,576,853 | 3/1986 | Vaughn et al. . |
| 4,716,072 | 12/1987 | Kim .................. 428/409 |
| 4,850,723 | 11/1989 | Ackley .................. 264/136 |
| 4,948,661 | 8/1990 | Smith et al. .................. 428/409 |
| 4,950,439 | 8/1990 | Smith et al. .................. 264/294 |

FOREIGN PATENT DOCUMENTS 826012 12/1959 United Kingdom .

Primary Examiner—James C. Cannon

[57] ABSTRACT

Fiber reinforced thermoplastic molded products, sheets, and the like, having a glossy surface are produced by intimately blending discrete reinforcing fibers (e.g. fiberglass) and thermoplastic fibers (e.g. polypropylene or polycarbonate) into a web. The web is heated to the melting point of the thermoplastic fibers while applying pressure, to eliminate air and press the web into a consolidated structure. Breakage of the reinforcing fibers is minimized by limiting the thickness of the web and limiting the pressure so as to produce a consolidated structure with minimal fiber breakage and a Notched Izod of at least one. Layered consolidated structures, some without reinforcing fibers, may be heated and pressed together to form a final structure having a thickness greater than the individual structures. The great majority of the fibers are provided so that the fibers of each type are within the range of about 0.5–5 inches. A sheet capable of replacing an automotive metal panel (that is having sufficiently high gloss, rigidity and impact characteristics) is provided, the sheet having a Notched Izod of at least about two and preferably at least about five. Products with Notched Izods of up to eight or nine may be achieved.

3 Claims, 1 Drawing Sheet

United States Patent Office

PTO - BOYERS, PA Duty Station

MISSING PAGE TEMPORARY NOTICE

PATENT # 5011,737 FOR ISSUE DATE 4-30-1991

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 1

N/A at Boyers
7/30/92

Data Conversion Operation
Boyers, Pa

GLOSSY FINISH FIBER REINFORCED MOLDED PRODUCT AND PROCESSES OF CONSTRUCTION

This is a division of U.S. application Ser. No. 07/314,896, filed Feb. 24, 1989, now U.S. Pat. No. 4,948,661, which is a continuation-in part of application Ser. No. 07/071,969, filed July 10, 1987, now U.S. Pat. No. 4,950,439.

FIELD OF THE INVENTION

This invention relates to reinforced thermoplastic molding materials in which the reinforcement is impregnated with a thermoplastic.

BACKGROUND OF THE INVENTION

Reinforced plastic materials, particularly fiber-reinforced plastic materials, have been prepared by various procedures in which the plastic is pre-impregnated into a fibrous reinforcement. The plastic used as the continuous phase is usually of the thermoset type with chopped or relatively short reinforcing fibers distributed uniformly in the plastic matrix. A limited number of thermoplastic-based reinforced systems are known, for instance, as a liquid plastic added to a fibrous bat or in a film stacking process in which alternating layers of fibrous reinforcement and thermoplastic film are plied one atop the other then consolidated with heat and pressure to form a consolidated laminated article.

To the best of our knowledge, a fiber reinforced thermoplastic prepreg material containing a substantial, functionally significant amount of long fiber reinforcement presenting a smooth, glossy, cosmetically attractive surface has not been described by a thermoforming process. The thermoplastic properties of the prepreg material allow forming and processing procedures not possible with thermosetting reinforced materials. The fiber reinforced thermoplastic prepreg materials of this invention may be thermoformed into a final shape with heat and pressure in a single step or previously consolidated prepregs may be heated and formed in conventional (unheated) metal forming presses.

SUMMARY OF THE INVENTION

The invention particularly relates to, though it is not limited to in all respects, smooth, glossy finished fiber reinforced thermoplastic prepreg materials composed of reinforcement fibers impregnated with and surrounded by thermoplastic. Prior to consolidation, the material preferably consists of thermoplastic fibers and reinforcing fibers, intimately blended together. When heated, with the aid of pressure, the thermoplastic fibers melt, surround and impregnate the reinforcing fibers and provide a smooth, glossy finish to the reinforced article. Excellent surface appearance, appropriate mechanical properties, and the ability to accommodate high-speed processing characterize the prepreg materials of this invention.

According to one aspect of the invention, there is provided a process of preparing a fiber reinforced thermoplastic molded product having a glossy surface. The process comprises the steps of: (a) Blending discrete reinforcing fibers and thermoplastic fibers to provide a uniformly blended distribution, and forming the blended fibers into a web. (b) Heating the web to at least the melting point of the thermoplastic fibers and applying pressure to the web to cause the thermoplastic fibers to melt, to eliminate air from the web and to press the web into a consolidated structure. And, (c) minimizing breakage of the reinforcing fibers during the practice of step (b) by limiting the thickness of the web subjected to heat and pressure, and limiting the pressure, so as to produce a consolidated structure with minimal fiber breakage and a Notched Izod of at least one. Optionally, the web can be corrugated prior to consolidation. A final structure having a thickness greater than that of the consolidated structure can be produced by layering a plurality of consolidated structures together, with or without unreinforced layers, and then heating them to the melting point of the thermoplastic to cause the thermoplastic to remelt, while eliminating air from the web and pressing the web into a final structure having a thickness greater than that of the individual consolidated structures. A web of a thickness of about one inch or less is normally utilized to produce a consolidated structure having a thickness in the range of about 0.05 to 0.10 inches.

According to another aspect of the present invention, there is provided a fibrous reinforced thermoplastic material having high modulus, high ductility, and high gloss, with a Notched Izod of at least one. Such a sheet, if the Notched Izod thereof is at least about two, is capable of replacing an automotive metal panel. The reinforced fibers comprise fiber bundles of fiberglass which have been opened into discrete staple filaments.

According to the invention there also is provided a fiber reinforced polypropylene composite having a uniform distribution of reinforcing fibers and high gloss, with a Notched Izod of at least about seven.

According to yet another aspect of the invention, a fibrous reinforced thermoplastic composite is provided having a surface appearance value recorded at 20° and 60° gloss angle measurement for ASTM standard D-523 exceeding 10 and 50, respectively, and including a nucleating agent for enhancing the gloss thereof. The nucleating agent may be carbon particles, various pigments, and/or Millad, a sorbitol material.

According to another aspect of the present invention there is a process for preparing a fiber reinforced thermoplastic product having a glossy surface. The process comprises the steps of: (a) Providing reinforcing fiber in discrete staple form (e.g. by opening up fiber bundles of a reinforcing fiber to form discrete staple filaments). (b) Providing thermoplastic fiber in discrete staple form (e.g. by opening up the fiber bundles of a thermoplastic fiber to form discrete staple filaments). (c) Practicing steps (a) and (b) so that the length of the great majority of fibers of each type is within the range of about 0.5-5 inches. (d) Intimately blending the discrete reinforcing and thermoplastic fibers into a web. And, (e) heating the web to at least the melting point of the thermoplastic fibers and applying pressure to the web to cause the thermoplastic fibers to melt to eliminate air from the web and press the web into a consolidated product. The web optionally can be corrugated prior to step (e).

It is the primary object of the present invention to provide for the production of fibrous reinforced thermoplastic material sheets and products having high modulus, high ductility, high gloss, and good rigidity and impact characteristics. This and other objects of the invention will become clear from an inspection of the detailed description of the invention, and from the appended claims.

BRIEF DESCRIPTION OF THE DRAWINGS

FIG. 1 is an elevated perspective view of an unconsolidated bat of an intimate blend of thermoplastic and reinforcing fibers arranged in a continuous web;

FIG. 2 is an elevated perspective view in partial cross-section of an unconsolidated corrugated web of an intimate blend of thermoplastic and reinforcing fibers;

FIG. 3 is a cross-sectional schematic illustration of consolidating a continuous or corrugated fibrous web; and FIG. 4 is an elevated perspective view of the resulting fiber reinforced thermoplastic product.

DETAILED DESCRIPTION

The attached Figures illustrate successive steps in preparing a glossy finish fiber reinforced molded product according to the invention. An intimate blend of discrete reinforcing fibers and thermoplastic fibers thoroughly intermixed with each other is laid or arranged into a continuous web (FIG. 1); this web is optionally corrugated to provide a much higher fiber weight per square unit of surface area or a plurality of webs plied then corrugated as in FIG. 2. The web or corrugated web as the case may be, is pressed with heat as illustrated in FIG. 3 to consolidate the web, force the thermoplastic to fully impregnate the reinforcing fibers and to provide the smooth, glossy surface desired. A fully consolidated, glossy sheet fiber reinforced molded sheet (FIG. 4) results.

Fiber reinforced molded products having a smooth, glossy finish are prepared by consolidating a web of intimately blended and mixed discrete reinforcing fibers and discrete thermoplastic fibers in a reinforcing fiber to thermoplastic fiber weight ratio of about 10:90 to about 60:40. Preferably the web is corrugated prior to consolidation; additional thermoplastic in the form of powder may be added to the web prior to consolidation.

Consolidated fiber reinforced molded sheets and three dimensional objects having a glossy surface at least in excess of 20 at 20°, preferably in the range of 40 to 60 at 20° measurement, are consistently obtained. Unconsolidated fibrous webs of blended discrete reinforcing fibers and discrete thermoplastic fibers having a melt index of from 5 to about 100 and the molded products consolidated from such webs also may be utilized in the practice of the invention.

The glossy finish fiber reinforced molded product is made from a fiber reinforced thermoplastic prepreg using various procedures. According to a first embodiment, a thermoplastic fiber of any particular type, preferably having a melt index in the range of 30 to 50, is blended with a reinforcement fiber until the fibers are uniformly distributed. Glass fibers, graphite fibers, aramid fibers such as KEVLAR ® (DuPont), steel and coated fibers such as metal coated glass may serve as the reinforcing fibers. Although mixtures of two or more of these fiber types may be used, usually only one type of fiber is selected. The reinforcing fibers represent from about 10 to about 60% of the total fiber weight of the prepreg, with a reinforcement fiber content of about 25% being preferred. The balance is represented by the thermoplastic fibers. Thermoplastic fibers suitable for the invention may be from any thermoplastic capable of being formed into a fiber, e.g., polypropylene, polypropylene copolymers, polyethylene, polyethylene copolymers, segmented polyurethane elastomers, polyester, nylon, elastomers, EVOH, polyurethanes, thermoplastic polyesters, and blends and alloys thereof. Following intimate mixing, the fibers may be formed into a web in a number of ways. For example, they may be laid into a fiber mat or web on air-lay equipment with the fiber pattern or orientation determined by the air-laying equipment. Other ways of making the basic mat include using carded and cross-laid equipment, and good opening and chute feed batt forming equipment.

The web may be arranged in a corrugated style as described in U.S. Pat. No. 4,576,853. The corrugated web is then subjected to further processing, as explained in more detail below. In a second embodiment, the same types of fibers are selected and intimately blended together; however, the web is not corrugated—it is simply taken off of the conveyor after air laying and held in inventory for further processing.

The blended fibers, corrugated or otherwise, are placed in a press maintained above the melting point of the thermoplastic fiber, the press is closed and the fiber mass is subjected to pressure, for instance 10 psi, for a brief period of time in order to cause the thermoplastic fibers to melt, spread evenly throughout and uniformly impregnate the reinforcement fiber mass and to form a smooth, glossy coherent surface on both faces of the shaped article.

The blended fiber webs or corrugated webs may be formed into three dimensional objects with heat and pressure or consolidated into flat sheets or rolls as flat stock for later pressing and forming operations. Consolidated sheets have a considerably smaller volume and are more convenient to handle than the fibrous webs.

Thermoplastic prepregs are readily formed into three dimensional objects in conventional metal forming equipment using known fabricating techniques, and as such may be used in conventionally available metal working equipment, for instance by heating the thermoplastic prepreg external of the press, then quickly pressing in a press designed primarily for metal forming and fabricating. Because the prepreg is thermoplastic, excess materials or pressed articles not meeting the standard desired may be heated and remelted without. significant loss of material.

The smooth, mirror-like surface achieved by the process qualifies as a "Class A" surface. This high quality, smooth surface is achieved because the separated and discrete thermoplastic filaments provide a uniform, non-centralized flow of thermoplastic throughout the fiber reinforced mass, thus intimate blending and thorough intermixing of the thermoplastic fibers with the reinforcing fibers is essential to achieving a smooth, mirror-like surface. Because the fibers are discrete instead of bundled, a smooth surface finish can be obtained.

The reflectance characteristics responsible for the glossy appearance of high-gloss surfaces may be quantified according to ASTM D-523, Specular Gloss.

The use of structurally significant quantities of reinforcing fibers in the thermoplastic molding composition increases the heat distortion temperatures to which the material may be successfully subjected, increases the impact strength and the stiffness as well. The proportion of reinforcing to thermoplastic fibers in the unconsolidated web represents a balance between engineering properties of the product on the one hand and a smooth, glossy surface on the other. Preferably the reinforcing fibers represent up to as much as 60% of the weight of the web or corrugated web prior to consolidation.

The products of this invention in addition to having a smooth, glossy surface are also well adapted to serve as structural products because of their relatively high (30%–40%) degree of reinforcement. The thermoplastic component of the web preferably forms more than 50% by weight of the intimate blend and may consist of discrete thermoplastic fibers optionally supplemented with thermoplastic powders. One may employ commercially available thermoplastic fibers per se or thermoplastic materials which can be formed into fibers and separable into discrete filaments or staple fibers. The performance properties of the thermoplastic fibers will be selected in part based upon the use to which the glossy finish fiber reinforced molded product is to be placed. The thermoplastic component of the web must have a melt index under operational temperatures that will allow the thermoplastic to flow, displace air from the web and provide the smooth, glossy surface characteristic of the products of this invention. Melt indexes in the range of 30 to 50 are thus preferred, although as the reader will appreciate, the exact melt viscosity will also be controlled by the temperature used for consolidating the web.

In the case of the consolidated sheet, the sheet is taken to an oven and heated beyond its melting point and then immediately transferred to a cold stamping press and stamped in a period of only about 10 to 15 seconds into the desired configuration, such as the fender of a car, a typewriter case, a sink, a helmet, a small boat or an aircraft seat.

In another arrangement, the thermoplastic sheet molding compound unconsolidated web is placed into a hot mold in a low pressure hydraulic press which is maintained at a temperature above the melting point of the resin. The press is closed forcing the thermoplastic resin and reinforcing fibers to flow in the mold to provide a part having several varying thicknesses, with molded-in fastening points, ribs, etc., then removed from the mold and cooled. Parts made with this technology may include front or rear ends of automobiles, aircraft wing and tail sections, seating, luggage, radiators, fan shrouds, air and chemical duct work, packaging trays, microwave cookware, furniture, doors or sanitary ware as a replacement for vitreous ceramics.

The physical properties of the final fiber reinforced molded products offer the best possible surfaces of reinforced composites obtainable because of the use of discrete staple filaments. The unique mixture of fiber reinforcements with the thermoplastic resins in fiber form allows air to be effectively eliminated from the web structure as the web is consolidated.

The intimately blended reinforcing and thermoplastic fibrous web is preferably prepared as follows: Staple fiber (both thermoplastic and reinforcing) is taken from a bale, weighed, the individual fiber bundles opened and blended. The staple fiber for both the reinforcement (fiberglass, carbon, aramid) fibers and the thermoplastic (polypropylene, polyester, nylon) fibers are used in combination and are intimately blended together. The blend ratio may range from 10/90% to 60/40%, respectively, by weight. The proportion of thermoplastic to reinforcing fibers will vary depending upon the structural requirements of the article to be molded balanced against the need for a smooth, glossy surface appearance. The blend is processed on conventional textile equipment which opens the fiber bundles into discrete fibers and blends the reinforcement and resin fibers together. The fiber blend is preferably processed on textile air laying equipment which reduces breakage of the fibers (it is useful to maintain a high length to diameter ratio of the reinforcing fibers) and produces a web ranging from about 5 to 10 ounces per square yard.

The web can be run through a corrugating machine which mechanically folds the web to produce corrugations, as described in U.S. Pat. No. 4,111,733, or simply accumulated as a continuous web on rolls.

The fibrous structure or web (optionally corrugated) is heated with pressure to eliminate air from the structure and to allow bonding of the resin matrix to form a sheet product or thermoplastic sheet molding compound. The sheet product may be molded into any desired two or three dimensional shape by heating followed by cold compression molding or stamping, or by simultaneously heating and molding the sheet by thermoforming.

The sheet product may be constructed from multiple webs plied one atop another and when consolidated produces an almost identically appearing product as described above.

Samples of reinforced consolidated sheets made according to the invention, including alternate fabrication and consolidation procedures, as well as comparative samples, were prepared according to Examples 1-5 and the samples were measured for gloss level. The results are reported in Table I that follows.

It has been found according to the present invention that it is important in producing products according to the invention to minimize breakage of the reinforcing fibers during heating of the web and application of pressure to cause the thermoplastic fibers to melt, and to eliminate air from the web. One preferred way that this is done is by limiting the thickness of the web that is inserted into a combination press/mold, to about one inch or less. The consolidated structure so produced comprises a sheet having a thickness range of about 0.05 to 0.10 inches. The sheet also—where minimized breakage of the reinforcing fibers does successfully take place—has a Notched Izod of at least one, indicating acceptable impact characteristics. In fact, according to the invention it is possible to get Notched Izod levels of nine, or possibly even higher. Practicing the invention, it is readily possible to produce sheets or products that are capable of replacing automotive metal panels. That is sheets or products according to the invention will have sufficiently high gloss, rigidity and impact characteristics to effectively replace an automotive metal panel, having a Notched Izod of at least about two and preferably of at least about five. Also according to the invention fiber reinforced polypropylene composites having a uniform distribution of reinforcing fibers may be produced, having high gloss, and a Notched Izod of at least about seven and preferably at least about eight.

For certain thermoplastic materials, particularly polypropylene, it has been found according to the present invention that the provision of a nucleating agent also enhances the gloss thereof. Particularly for polypropylene the nucleating agent could be selected from carbon particles, certain pigments (i.e. polypropylene-compatible pigments), and "Millad", a sorbitol material sold by Milliken Chemical Company; or mixtures thereof.

If it is desired to produce a final structure having a thickness greater than that of a consolidated structure as described above, this may readily be accomplished by layering a plurality of consolidated structures (with or without other unreinforced sheets) together. The structures layered together also should have a thickness of about one inch or less. Then, after layering, the consolidated structures (optionally with unreinforced sheets) are heated to the melting point of the thermoplastic therein to cause the thermoplastic to remelt, while eliminating air from the web and pressing the web into a final structure having a thickness greater than that of the consolidated structure. Thus final molded parts or preforms can be produced having a thickness much greater than the 0.05-0.10 inch thickness range of consolidated structures that are produceable at any one time.

It has also been found according to the present invention that the length of fibers plays a part in determining how successfully a glossy surface fiber reinforced thermoplastic product can be produced. In a typical practice of the invention, fiber bundles of a reinforcing fiber are opened up to form discrete staple filaments, and similarly fiber bundles of a thermoplastic fiber are opened to form discrete staple filaments. These steps are practiced so that the length of the great majority of the fibers of each type is within the range of about 0.5-5 inches. The fibers are then intimately blended together, and heated under pressure to cause the thermoplastic fibers to melt while eliminating air, and while pressing the web into a consolidated product. The typical length of glass reinforcing fibers that is utilized is at least 0.5 inches to several inches. The upper limit would be presumed from the inability to mix very short fibers with very long fibers. Fiber diameters in excess of 0.020 inches would not be desirable for the organic fiber portion due to difficulties in intimate mixing. Glass fibers (or like reinforcing fibers) are usually less than 0.001 inches in diameter. In general, the length and diameter characteristics of the fibers must be such to ensure intimate mixing of the fibers in order to get a class A type surface and good physical properties for structural use.

Various examples which show the aspects of the present invention described above are as follows:

EXAMPLE 1

Thermoplastic polypropylene fibers (Amoco, type 10, color 1312) and reinforcing glass fibers (Owens Corning Fiberglas, type 700, H-filament) were individually separated into discrete fibers, followed by intimately blending in a 70/30 (by weight) thermoplastic/glass fiber ratio. The blend was processed on air laying equipment (Rando Webber Model #458, #RWP 792) to produce a web in the range of 5-10 oz./sq. yd., and a width of forty inches and a thickness of slightly less than 1 inch. The web was then corrugated according to the procedures described in U.S. Pat. No. 4,111,733 to produce a corrugated web of the intimately blended thermoplastic and reinforcing fibers.

A piece from the corrugated web was heated at 450° F. under ten psi pressure for three minutes between polished metal plates, cooled to ambient temperature and demolded to produce a reinforced thermoplastic sheet with gloss values of 27 at 20° and 64 at 60° measurements, as shown in Table I. The sheet had a thickness of about 0.6 inches.

The typical properties of sheet made in this example were:
Tensile Strength, psi 6,700
Flexural Modulus, psi 730,000
Notched Izod, ft-lb/in. notch 3.2

In order to determine the distribution of the reinforcing fibers in the web formed from this process, a series of the same fibers used above were formed into sheets, and samples were cut from the sheets in Cross Directional and Unidirectional modes. The mechanical properties of these sheets were:

Cross Directional

Tensile Strength, psi 6,700
Flexural Modulus, psi 650,000
Notched Izod, ft-lb/in. notch 3.0

Unidirectional

Machine Direction
Tensile Strength, psi 6,600
Flexural Modulus, psi 680,000
Notched Izod, ft-lb/in. notch 3.1

Transverse Direction
Tensile Strength, psi 6,200
Flexural Modulus, psi 610,000
Notched Izod, ft-lb/in. notch 2.9

The mechanical properties of the machine direction, transverse direction and cross direction evidence the uniform distribution of the glass fibers.

The glass level was verified by ignition of a sample at 800° C. in a muffle furnace, and weighing before and after ignition in a conventional manner.

EXAMPLE 2

The procedure of Example 1 was repeated this time using a mixture of 80 parts by weight of polypropylene fibers and 20% by weight of glass fibers, using the same fibers as in Example 1. The physical properties were:
Tensile Strength, psi 6,200
Flexural Modulus, psi 540,000
Notched Izod, ft-lb/in. notch 2.5
The gloss level of this sample is shown in Table I.

EXAMPLE 3

A sample of the same polypropylene fibers used in Example 1 was prepared, with no glass fibers, using the same procedure as in Example 1. The physical properties were:
Tensile Strength, psi 5,400
Flexural Modulus, psi 360,000
Notched Izod, ft-lb/in. notch 0.5
The gloss level of this sample is shown in Table I.

EXAMPLE 4

A sheet prepared as in Example 1 (30% fiber glass) and sheets prepared as in Example 3 (no fiber glass) were consolidated in a press at 450° F., with the sheets from Example 3 sandwiching the sheet from Example 1, to yield a composite having 89% by weight polypropylene fibers (Hercules type 136, color #613) and 11% by weight glass fibers (Owens Corning Fiberglas, Type 700, Cardable H filament). The gloss levels for this composite, which had a thickness greater than that of the consolidated sheets which make it up, are shown in Table I.

EXAMPLE 5

For purposes of comparison, Azdel, a commercial composite composed of continuous strand glass fiber reinforced thermoplastic polypropylene, manufactured by Azdel, Inc., was measured for gloss levels. Results are listed in Table I.

Specular Gloss Measurements-samples prepared in EXAMPLES 1-5 were measured for specular gloss on a Hunter Dr. Large RL-3 device (Hunter Associates Laboratories, Inc., Reston, Va.) at measurement angles of 20°, 60° and 85° according to ASTM D-523. Gloss levels measured for each of the 5 examples were as follows:

TABLE I

GLOSS LEVELS OF REINFORCED COMPOSITES
ANGLE OF MEASUREMENT

| | 20° | | 60° | | 85° | |
|---|------|------|------|------|------|------|
| 1 | 23.7 | 29.4 | 63.1 | 64.5 | 80.9 | 84.5 |
| 2 | 39.3 | 40.6 | 74.4 | 74.4 | 92.1 | 91.5 |
| 3 | 57.8 | 56.8 | 78.2 | 78.2 | 94.9 | 96.0 |
| 4 | 50.9 | 50.1 | 70.9 | 70.7 | 92.6 | 93.5 |
| 5 | 5.2  | 5.3  | 30.6 | 40.4 | 66.3 | 74.2 |

EXAMPLE 6

Polypropylene thermoplastic resin fibers (Amoco Type 10 color 1312) and reinforcing glass fibers (Owens Corning Fiberglas Type 700 cardable H-filament) were individually separated into discrete fibers then intimately blended in a 70% thermoplastic/30% reinforcement fiber ratio. The blend was processed on air laying equipment (Rando Webber Model #458, #RWP 792) producing a 0.6 oz./sq. yd. web 40 inches in width, and then corrugated according to the procedures described in U.S. Pat. No. 4,111,733 to produce a corrugated web of the intimately blended thermoplastic and reinforcing fibers.

A piece from the corrugated web was heated at 450° F. under pressure (10 psi) for three minutes between polished metal plates, cooled to ambient temperature and demolded.

Subsequently, a polypropylene powder (50 grams, Exxon type PP 5215-GE) incorporating 3% of a black pigment (Morton Thiokol, Inc., Advance Glass Automate Black 104) is applied to the surface of the consolidated polypropylene and fiberglass composite as described above.

The coated consolidation was heated at 450° F. under pressure (10 psi) for three minutes between polished metal plates, cooled to ambient temperature and demolded to produce a grey reinforced thermoplastic sheet having a black surface. Both surfaces were lustrous and shiny.

EXAMPLE 7

Thermoplastic polypropylene fibers were made from polypropylene homopolymer with a Melt Index=30 and cut into 1.5 inch long filaments which were combined with reinforcing glass fibers as in Example 1. The blend was processed as in Example 1 without corrugating the web. Two separate operations were performed on this web with the following results:

A. The web was pressed from a thickness of about three inches at 450° F. under 60 psi pressure for one minute between polished plates.

B. Another piece of web was pressed from a thickness of about one inch at 450° F. under 60 psi pressure for one minute between polished plates.

The physical properties of these two sheets were:
Sample

| | A | B |
|---|---|---|
| Tensile Strength, psi | 3,570 | 5,360 |
| Flexural Modulus, psi | 426,000 | 493,000 |
| Notched Izod, ft-lb/in. notch | 5.7 | 7.3 |

EXAMPLE 8

A mixture of 70% by weight of PETG 6763 fibers and 30% glass fibers (Owens Corning type 700) were processed as in Example 1 at a press temperature of 500° F. and 60 psi after drying for about 16 hours at 160° F. The sheet produced by this process had a very glossy surface and the following physical properties:
Tensile Strength, psi 14,100
Flexural Modulus, psi 794,000
Notched Izod, ft-lb/in. notch 2.3

EXAMPLE 9

A mixture of 30% by weight glass fibers (Owens Corning type 700) and 70% by weight of Polycarbonate (Makrolon M-50) fibers were mixed according to Example 1, dried at 160° F. for about 16 hours and were pressed at 500° F. at 60 psi for about one minute. The glossy sheet resulting from this process had the following physical properties:
Tensile Strength, psi 14,100
Flexural Modulus, psi 1,040,000
Notched Izod, ft-lb/in. notch 2.3

EXAMPLE 10

A mixture of 30% by weight glass fibers (Owens Corning type 700) and 70% by weight of Polyethylene terephthalate (PET) fibers were mixed according to Example 1, dried at 160° F. for about 16 hours, and were pressed at 550° F. at 60 psi for about one minute. The glossy sheet resulting from this process had the following physical properties:
Tensile Strength, psi 14,000
Flexural Modulus, psi 850,000
Notched Izod, ft-lb/in. notch 2.6

EXAMPLE 11

A series of mixtures of 30% by weight glass fibers and 70% by weight Polycarbonate were prepared with lengths of glass fiber varying from 0.5 to 1.5 inches in length and Polycarbonate fiber varying from 0.5 to 2.0 inches in length. All the probable combinations were prepared according to Example 9. No significant differences were found in the mechanical properties of the formed sheets.

However, when the thickness of the Polycarbonate fiber exceeded 0.020 inches in diameter, intimate mixing of the glass and Polycarbonate fibers was not effective in producing uniformly dispersed glass fibers in the formed pieces.

EXAMPLE 12

A mixture of 15% by weight glass fibers and 15% by weight carbon fibers was mixed with 70% by weight Polypropylene fibers as in Example 1 to produce a conductive sheet, where the surface resistivity was less than 1 ohm/sq. cm. This sheet was laminated between two sheets of 100% Polypropylene to provide a multilayered sheet which had a conductive layer for protection against electromagnetic interference (EMI).

EXAMPLE 13

A mixture of 50% by weight glass fibers and 50% by weight Polypropylene fibers as in Example 1 was formed. This 0.060 inch thick consolidated sheet was then laminated between two thin Polypropylene sheets so that the final level of glass was 30%. The resulting sheet had the same physical properties as that in Example 1.

The practice of the present invention may be accomplished in a wide variety of combination press/mold structures. It could be done either in a bath, or a generally continuously basis. For example a conventional Sandvik continuous belt press could be utilized.

Nucleating agents may be added where required, and their incorporation is usually through compounding them with the appropriate resin prior to fiber production. They are particularly appropriate for use with polypropylene for gloss enhancement. Other methods of incorporation of nucleating agents are possible.

The teachings according to the invention are applicable to a wide variety of thermoplastic and reinforcing fibers. Thermoplastic fibers which may be utilized according to the invention are polyethylene, polypropylene, polyester, PETG, nylon, elastomers, EVOH, thermoplastic polyesters, polyurethanes, polyamide, polyphenylene sulfide, polycarbonate, and blends and alloys thereof. Fiberglass fibers are preferred as the reinforcing fibers, although other reinforcing fibers such as aramid, graphite, and the like—as described above—may be utilized.

While the invention has been herein shown and described in what is presently conceived to be the most practical and preferred embodiment thereof, it will be apparent to those of ordinary skill in the art that many modifications may be made thereof, and that the invention is to be accorded the broadest interpretation of the scope of the appended claims.

What is claimed is:

1. A fibrous reinforced thermoplastic composite having the surface appearance value recorded at 20° and 60° gloss angle measurement for ASTM standard D-523 exceeding 10 and 50, respectively, and including a nucleating agent for enhancing the gloss thereof comprising a heat and pressure consolidated non-needled, non-woven web which prior to consolidation comprised a mixture of reinforcing fibers and matrix-providing thermoplastic fibers and to which prior to consolidation no liquid binder had been applied.

2. A composite as recited in claim 1 wherein the thermoplastic is polypropylene, and wherein the nucleating agent is selected from the group consisting essentially of one or more of carbon particles, polypropylene-compatible pigments, and a sorbitol material.

3. A composite sheet as recited in claim 1 wherein the thermoplastic is polypropylene and wherein the nucleating agent is selected from the group consisting essentially of carbon particles, selected pigments, and a sorbitol material.

* * * * *